Sept. 9, 1969    J. E. FEMIA    3,466,081
DELAY ACTION DEVICE
Filed Oct. 17, 1967    3 Sheets-Sheet 1
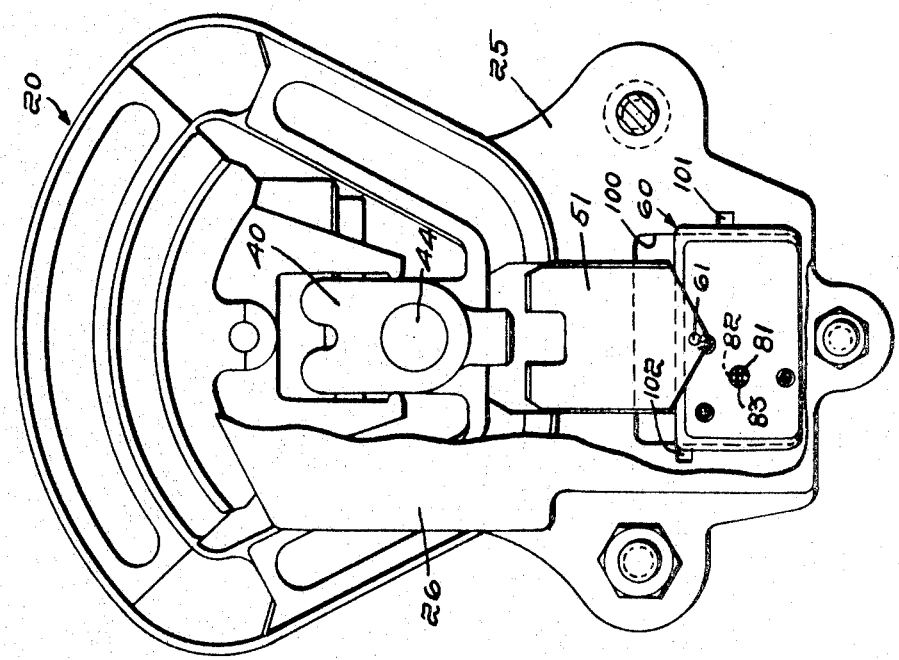
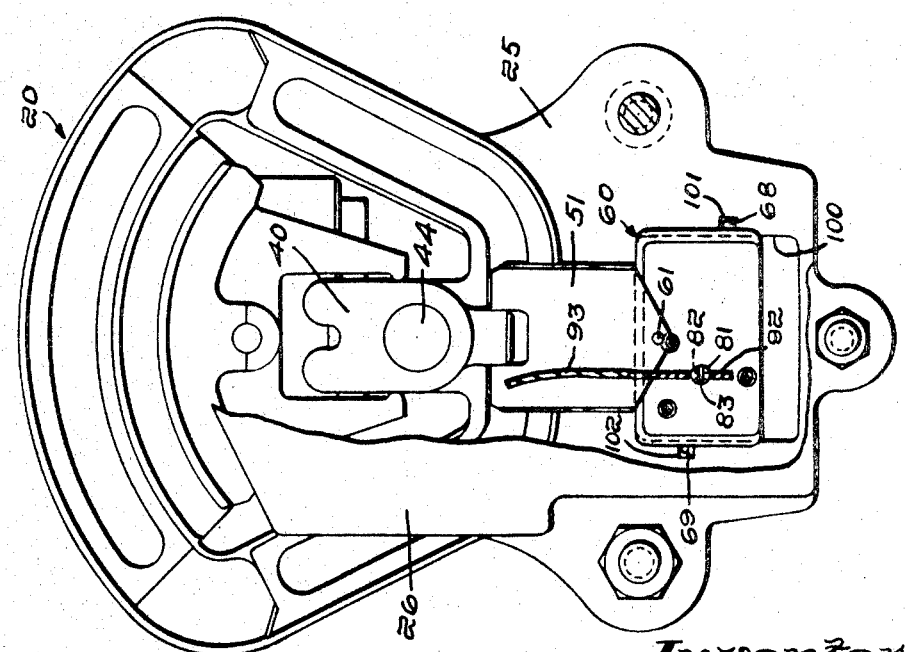
Inventor:
Joseph E. Femia,
by Harry M. Saragovitz,
Edward J. Kelly, Herbert Berl
+ Charles J. Murphy
Attorneys Sept. 9, 1969  J. E. FEMIA  3,466,081
DELAY ACTION DEVICE
Filed Oct. 17, 1967  3 Sheets-Sheet 2

Inventor:
Joseph E. Femia,
by Harry M. Saragovitz,
Edward J. Kelly, Herbert Berl
& Charles F. Murphy
Attorneys Sept. 9, 1969          J. E. FEMIA          3,466,081

DELAY ACTION DEVICE

Filed Oct. 17, 1967          3 Sheets-Sheet 3

Inventor:
Joseph E. Femia,
by Harry M. Saragovitz,
Edward J. Kelly, Herbert Berl
& Charles J. Murphy
Attorneys

United States Patent Office 3,466,081
Patented Sept. 9, 1969

3,466,081
DELAY ACTION DEVICE
Joseph E. Femia, Framingham, Mass., assignor to the United States of America as represented by the Secretary of the Army
Filed Oct. 17, 1967, Ser. No. 676,392
Int. Cl. B64d 17/38; G05g 1/04
U.S. Cl. 294—83
9 Claims

ABSTRACT OF THE DISCLOSURE

A delay action device for arming a parachute release mechanism after a preselected time period following extraction of an airdrop load from an aircraft which comprises a pair of keys operated simultaneously in opposite directions by a toggle for unlocking the device, the unlocking action being controlled by a timing mechanism which actuates the keys at a preselected time after deployment of the parachutes.

---

The invention described herein may be manufactured, used, and licensed by or for the Government for governmental purposes without the payment to me of any royalty thereon.

This invention relates to a delay action device for use in conjunction with a parachute release to arm the latter after a selected time interval following the extraction of an airdrop load from an aircraft.

When heavy loads of equipment or supplies are airdropped, there is a possibility that surface winds will cause the parachutes to drag or overturn the load with resulting damage thereto. Various means have been employed for preventing this. The most frequently used method is to interpose a parachute release mechanism between the parachutes and the load, the release mechanism being armed or set to release the parachutes from the load as soon as the load impacts the ground.

A recently developed parachute release mechanism for this purpose is described in patent application Ser. No. 611,177 of Walter L. Beckwith, Jr., now Patent No. 3,393,001. This tilt-type release operates to release the parachutes from the load when the angle between the parachutes and the load reaches a predetermined size. This type of release is very reliable since any surface wind will almost immediately upon ground impact carry the parachutes laterally and actuate the release. However, during deployment of the parachutes at the beginning of the drop there is a tendency for the load and parachutes to swing considerably such that the release must be locked to prevent unintended operation until the parachute-load system achieves a stabilized descent condition. Since the time required to achieve this condition is relatively constant and can be readily determined, it is desirable to utilize some form of time delay unlocking or arming mechanism in this type of release.

Time delay-type devices which operate either hydraulically or pyrotechnically are described in the Beckwith, Jr. patent application referred to above. These time-delay devices have operated well for the most part, but experience has shown that occasional failures have occurred because of the arming of the parachute release mechanism before extraction of the load from the aircraft or prior to stabilized descent of the parachute-load system. As a result, any excessive swinging between the main parachutes and the load thereafter may permit separation of the main parachutes from the load in the aircraft or in midair. Also, in the case of a pyrotechnic charge, a misfire results in failure of the parachutes to separate from the load upon ground impact because of lack of arming of the parachute release mechanism.

It is therefore an object of the present invention to provide a delay action device of an improved mechanical type for arming a parachute release mechanism to release the parachutes therefrom upon ground contact by the load connected thereto.

A further object of the invention is to provide a delay action device for arming a parachute release mechanism at a preselected time after deployment of the parachutes in an airdrop which can be used in repeated airdrops.

A still further object is to provide a relatively simple yet rugged delay action device for unlocking a parachute release mechanism at a preselected time after deployment of the parachutes in an airdrop preparatory to the disconnection of the parachutes from the load upon contact thereof with the ground.

Other objects and advantages will appear from the following description of one embodiment of the invention, and the novel features will be particularly pointed out hereinafter in connection with the appended claims.

In the accompanying drawings:

FIGURE 1 is a front elevation view, partially in section, of a parachute release mechanism including the delay action device of the present invention in the locking or disarming position, portions of one of the sideplates of the release mechanism being cut away to show the interior thereof;

FIGURE 2 is a front elevation view, partially in section, similar to the view in FIGURE 1 except that the delay action device is shown in the unlocking or arming position;

Figure 3:
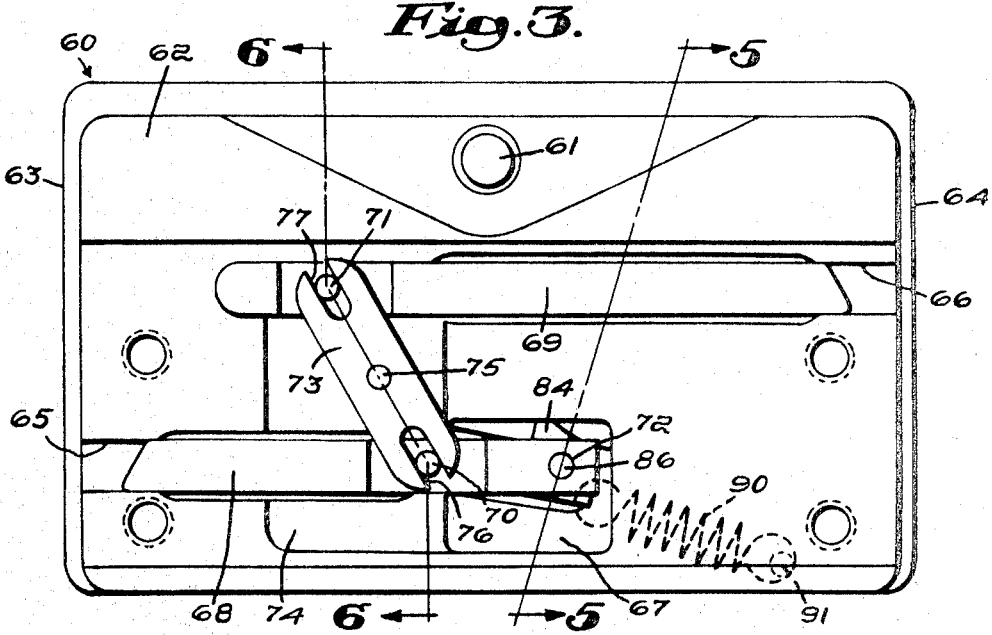
FIGURE 3 is a front elevation view of the delay action device of the invention, the cover plate thereof being removed, and the delay action device being in the unlocked position, as it is shown in FIGURE 2.

In the illustrated embodiment of the invention, the delay action device, represented generally by the numeral 60, is mounted between the back plate 25 and front plate 26 of a parachute release mechanism, represented generally by the numeral 20, of the type described in patent application Ser. No. 611,177 of Walter L. Beckwith, Jr., now Patent No. 3,393,001. In order for release mechanism 20 to release parachutes attached thereto, toggle element 40 must be free to pivot on toggle pin 44. A movable bifurcated locking element 51 is slideably mounted in front plate 26 for movement from a first or upper position shown in FIGURE 1, wherein it engages toggle element 40 to prevent pivoting thereof about pin 44 to a second or lower position shown in FIGURE 2 wherein the toggle element 40 is free to rotate about pin 44.

Locking element 51 is held in its first or upper position by delay action device 60 which is connected thereto by pin 61 and which is slideably mounted in a vertical channel 100 formed in the opposed inside surfaces of front plate 26 and backplate 25 for movement from a first or upper position, shown in FIGURE 1, to a second or lower position, shown in FIGURE 2. Delay action device 60 includes retractable means to be described hereafter which engage recesses 101 and 102 in the side walls of the portion of vertical channel 100 formed in backplate 25 to lock the delay action device and locking element 51 in their respective first or upper positions. Upon operation of said retractable means in a manner to be described, the delay action device 60 and locking element 51 are allowed to move, normally, by gravity, to their respective second and lower positions wherein the toggle element 40 is left free to rotate about pin 44 as required in the operation of the parachute release mechanism. If desired, the delay action device may be biased toward its second or lower position by a spring (not shown).

The delay action device 60 comprises a hollow body member 62 having generally parallel sides 63 and 64. Spaced parallel channels 65 and 66 are provided in the front surface of body member 62, channel 65 extending through side 63 and channel 66 extending through side 64 thereof. An opening 67 is provided through the front of body member 62 at the inner end of channel 65 for a purpose to be described. Elongated keys 68 and 69 are slideably mounted in channels 65 and 66 respectively for siliding movement from a first position wherein a portion of key 68 extends beyond side 63 and a portion of key 69 extends beyond side 64 as shown in FIGURE 4 to a second position wherein both keys are withdrawn into said channels as shown in FIGURE 3.

Figure 4:
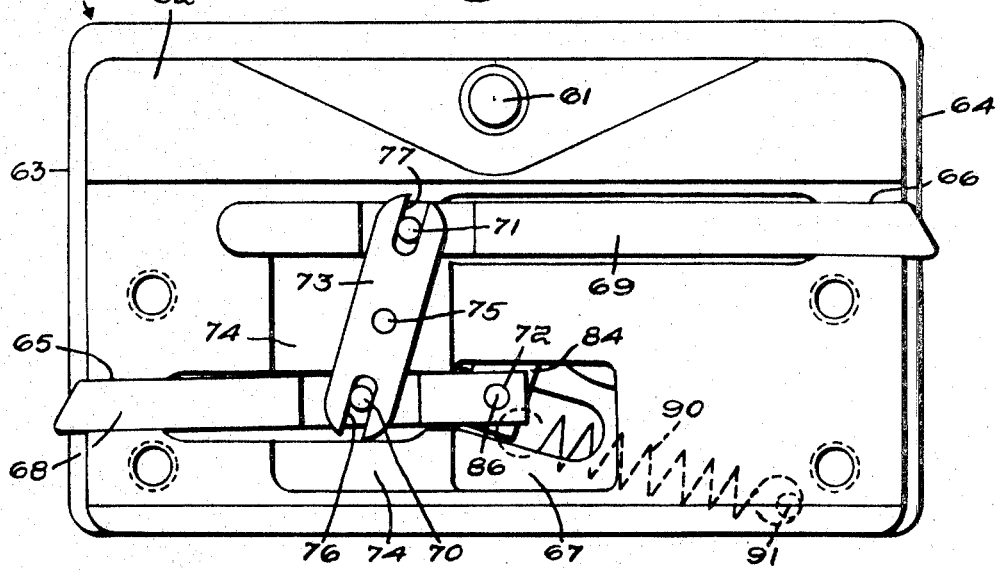
FIGURE 4 is a front elevation view of the delay action device of the invention, the cover plate thereof being removed, and the delay action device being in the locked position, as it is shown in FIGURE 1.
Figure 5:
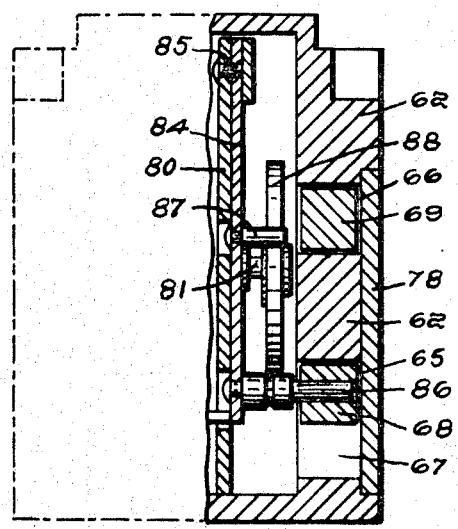
FIGURE 5 is a partial sectional view along the line 5—5 of FIGURE 3.
Figure 6:
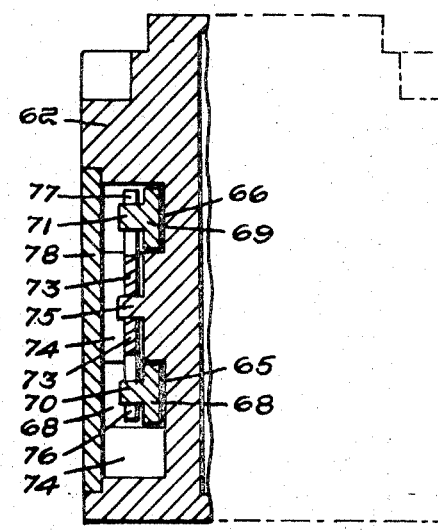
FIGURE 6 is a partial sectional view along the line 6—6 of FIGURE 3.

The outer ends of keys 68 and 69 are preferably tapered as shown in FIGURES 3 and 4 to simplify engagement in recesses 101 and 102 in the sidewalls of channel 100 in release mechanism 20. Keys 68 and 69 each carry a pin, designated 70 and 71 respectively, mounted thereon and key 68 is provided with a hole 72 therethrough near its inner end for a purpose to be described.

A toggle 73 is pivotally mounted in a recess 74 in the front surface of body member 62 between channels 65 and 66 by means of pin 75. The opposite ends of toggle 73 are provided with open ended slots 76 and 77 which engage pins 70 and 71 caried by keys 68 and 69, respectively. In this manner, keys 68 and 69 are coupled together such that movement of one key will result in substantially equal movement of the other key in an opposite direction through the action of toggle 73.

The elongated keys 68 and 69 and toggle 73 are held in place by a cover plate 78 which is held in place by screws 79.

A timing mechanism 80 comprising a spring driven mechanical timer is mounted within body member 62. The timer stem 81 is directly connected to the spring drive of the timer so that the stem 81 rotates both upon winding and unwinding of the mechanism. The free end of stem 81 extends through and beyond the back of body member 62 and has an opening 82 passing diametrically therethrough for a purpose to be described. The end of stem 81 has a slot 83 therein so that the stem may be turned with a screwdriver or the like. An elongated lever arm 84 is pivotally mounted on the timing mechanism by means of pin 85 located at one end of the lever arm. The opposite or free end of lever arm 84 is free to move through an arc as the lever arm 84 pivots on pin 85. Pin 86 is mounted no the free end of the lever arm 84 and extends through opening 67 in the front of body member 62 and into hole 72 in the inner end of key 68 whereby movement of the lever arm 84 will cause movement of keys 68 and 69.

Figure 7:
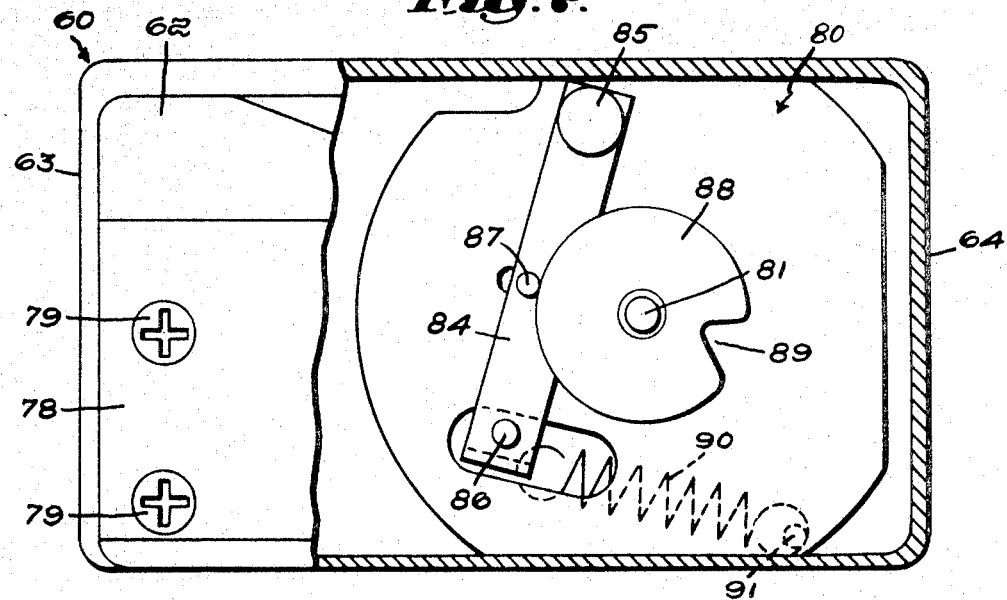
FIGURE 7 is a front elevation view, partly in section of the delay action device with portions thereof cut away to show portions of the timing mechanism which controls the time of unlocking of the delay action device.

Lever arm 84 also carries follower pin 87 which is located approximately midway between the pivot pin 85 and the free end of the lever 84. Follower pin 87 engages the periphery of a rotating cam 88 which is driven by the timing mechanism. As shown in FIGURE 7, cam 88 has a generally circular periphery with a single notch 89 therein. Follower pin 87 is biased against the periphery of cam 88 by spring 90 which extends between the free end of lever arm 84 and a point on the body of the timing mechanism where it is fixed by screw 91 such that as the cam is rotated by the timing mechanism, pin 87 rides along the periphery of the cam until the notch 89 reaches the follower pin 87, whereupon follower pin 87 drops into the notch 89 permitting the lever arm 84 to move under the influence of spring 90.

When the delay device 60 is in position in release mechanism 20, the free end of stem 81 lies in a vertically extending slot (not shown) through the front plate 26 of the release mechanism. The slot is intersected by a vertically extended channel (not shown) in the front plate 26 which provides a passageway for locking pin 92 and flexible release cable 93 which is connected to locking pin 92. Locking pin 92 engages in opening 82 of stem 81 of the timing mechanism to lock the stem 81 against rotation and thus prevent operation of the timing mechanism 80 until pin 92 is removed. Flexible cable 93 extends from pin 92 to a predetermined point on the parachute system suspension lines (not shown). The length of cable 93 is such that when the parachute system reaches a predetermined stage of deployment, cable 93 will pull pin 92 out of opening 82 in stem 81, causing the timing mechanism to commence operation.

In the use of the invention, the delay action device 60 is housed in channel 100 in the parachute release mechanism 20 and connected to locking element 51 as described above. With the delay action device in its second or unlocked position in the lower portion of channel 100 as shown in FIGURE 2, toggle element 40 is free to rotate, permitting the parachute system to be connected to the release mechanism. After this connection has been made, the toggle element 40 is rotated to the upright position shown in FIGURE 2 by manually aligning the release mechanism. The delay action device 60 is then raised to its first position as shown in FIGURE 1 with locking element 51 being thereby raised into engagement with toggle element 40, locking toggle element 40 in the upright position and thereby preventing operation of the release mechanism. Stem 81 of the timing mechanism is then rotated a predetermined amount in a clockwise direction by means of a screwdriver or the like, thus winding the spring that drives the timing mechanism. The rotation of stem 81 in a clockwise direction also results in rotation of cam 88 in the same direction a predetermined amount, for example, to the position shown in FIGURE 7. As this occurs, follower pin 87 is raised out of notch 89 in cam 88 and caused to ride on the periphery of cam 88 as the latter is being rotated. This causes lever arm 84 to be swung to the left (or clockwise) as seen in FIGURE 7, thereby moving keys 68 and 68 into their first or locked position when they engage recesses 101 and 102 in the sidewalls of channel 100 to lock the delay action device in its first or locked position. While the stem 81 is held in position with a screwdriver, pin 92 is inserted in opening 82 in the stem to lock it against rotation. The parachute release mechanism 20 is then connected to a load to be airdropped.

Subsequently, when the load with parachutes and parachute release mechanism containing the delay action device of the invention attached thereto is extracted from an aircraft and the parachutes deployed by conventional means, flexible cable 93 is pulled upward by the parachute system and pin 92 is extracted from opening 82, releasing stem 81 to rotate counterclockwise under the driving action of the spring of the timing mechanism 80. At the end of the predetermined time interval for which the timing mechanism is set, follower pin 87 drops into notch 89, causing lever arm 84 to pivot to the right (or counterclockwise) about pivot pin 85 as shown in FIGURE 7. As this occurs, the free end of lever arm 84 carrying pin 86 is moved to the right, causing key 68 to slide inwardly of the delay action device 60. This causes toggle 73 to rotate counterclockwise from its position as shown in FIGURE 4 to the position shown in FIGURE 3, moving key 69 inwardly of the delay action device. When keys 68 and 69 are withdrawn from recesses 101 and 102, the delay action device becomes unlocked and drops under the influence of gravity to its second position in the lower portion of channel 100, pulling locking element 51 with it and releasing toggle element 40 so that it will be free to rotate on pin 44 to permit the parachute release mechanism to operate when the load contacts the ground.

One of the oustanding advantages of the present invention is the fact that the delay action device is reusable. Further, it is very dependable since it is set in operation only when the parachutes are substantially fully deployed, thus avoiding premature arming of the release mechanism. In addition, it is virtually unaffected by atmospheric pressure and temperature changes and weather conditions generally. Finally, its relatively simple, rugged construction provides not only for low manufacturing cost but substantial resistance to physical damage.

It will be understood, of course, that various changes in the details, materials and arrangements of parts which have been herein described and illustrated in order to explain the nature of the invention, may be made.

I claim:

1. In a release mechanism for releasably connecting a parachute to a load, said release mechanism having a movable locking element, a delay action device comprising:

a body member connected to said locking element and capable of being mounted within said release mechanism for movement from a first position wherein said locking element locks said release mechanism against releasing action to a second position wherein said locking member is withdrawn to allow releasing action by said release mechanism, first and second elongated keys slideably mounted within said body member in spaced parallel relationship for movement between a first position wherein a portion of said first key extends beyond one side of said body member and a portion of said second key extends beyond the opposite side of said body member to engage fixed portions of said release mechanism when said body member is in its first position within said release mechanism and a second position wherein said keys are wholly within said body member, a timing mechanism mounted within said body member and having an elongated lever arm pivotally mounted thereon for predetermined movement upon the expiration of a predetermined period of operation of said timing mechanism, means carried by said lever arm engaging one of said elongated keys to cause sliding movement of said key upon movement of said lever arm, toggle means pivotally mounted in said body member between said elongated keys and engaging said keys to cause sliding movement of one of said keys in a direction opposite to sliding movement of the other of said keys, and means for starting operation of said timing mechanism upon the occurrence of a predetermined event, whereby upon expiration of said predetermined period of operation of said timing mechanism said lever arm will cause said elongated keys to move from said first position thereof to said second position thereof thereby releasing said body member for movement to its second position within said release mechanism wherein said locking element is withdrawn to allow releasing action by said release mechanism.

2. A delay action device as in claim 1 wherein said elongated lever arm is biased to move said elongated keys to said second position thereof.

3. A delay action device as in claim 2 wherein said timing mechanism comprises means for preventing movement of said biased lever arm until the expiration of said predetermined period of operation of said timing mechanism.

4. A delay action device as in claim 1 wherein said timing mechanism comprises a stem wound spring driven mechanical driver having a directly connected stem provided with a diametrical opening therethrough near the free end thereof and wherein said means for starting operation of said timing mechanism comprises a removable pin capable of engaging in said opening in said stem to prevent rotation thereof until the occurrence of a predetermined event.

5. A delay action device as in claim 4 wherein said removable pin is attached to a portion of a parachute attached to said release mechanism by elongated flexible means having a length which is less than the distance between said release mechanism and the point of attachment thereof to said parachute when said parachute is fully deployed whereby said pin will be withdrawn from said opening in said stem to start operation of said timing mechanism when said parachute is fully deployed.

6. A delay action device as in claim 1 wherein said toggle is pivotally mounted substantially midway between the ends thereof whereby movement of one of said keys causes substantially equal and opposite movement of the other of said keys.

7. A delay action device as in claim 1 wherein said toggle comprises an elongated body having open ended slots in each end thereof, said slots engaging pins mounted on said elongated keys.

8. A delay action device as in claim 1 wherein said means carried by said lever arm comprises a pin engaging in an opening provided in one of said elongated keys.

9. A delay action device as in claim 1 wherein said opposite sides of said body member are substantially parallel.

References Cited

UNITED STATES PATENTS

| 3,081,121 | 3/1963 | Campbell | 294—83 |
|---|---|---|---|
| 3,173,718 | 3/1965 | Harley | 294—83 |
| 3,249,328 | 5/1966 | Knowles | 294—83 |

HARVEY C. HORNSBY, Primary Examiner

U.S. Cl. X.R.

74—106, 520